INVENTOR.
GEORGE A. REED
BY Hodges
Harvey A. David
ATTYS.

INVENTOR.
GEORGE A. REED

Aug. 22, 1967  G. A. REED  3,337,761
ELECTROGEAR STEERING GEAR
Filed April 30, 1965  6 Sheets-Sheet 5

INVENTOR.
GEORGE A. REED
BY Hodges
Harvey A. David
ATTYS.

Aug. 22, 1967 G. A. REED 3,337,761
ELECTROGEAR STEERING GEAR
Filed April 30, 1965 6 Sheets-Sheet 6

INVENTOR.
GEORGE A. REED
BY
ATTYS.

United States Patent Office 3,337,761
Patented Aug. 22, 1967

3,337,761
ELECTROGEAR STEERING GEAR
George A. Reed, Williamsville, N.Y., assignor, by mesne assignments, to the United States of America as represented by the Secretary of the Navy
Filed Apr. 30, 1965, Ser. No. 452,420
7 Claims. (Cl. 310—80)

This invention relates to shipboard steering apparatus and more particularly to an improved electrically operated drive means for rotatively positioning a rudder shaft to effect steering.

It is a principal object of this invention to provide an improved electromagnetic rudder shaft positioning apparatus capable of satisfying the long term rotational and holding requirements of rudder control, as well as the ability to attain its maximum rotational speed or to come to a holding position within a small increment of rotation.

Another object of this invention is the provision of a particularly reliable steering drive apparatus including a stator comprising an annular array of electromagnetic stator segments surrounding a flexible annular rotor connected to the rudder shaft, and which rotor is magnetically deformable by rotating field energization of the stator segments whereby the rotor is caused to hypocyclically "walk" about the inner circumferential surface of the stator and to produce rotation of the rudder shaft at a speed substantially less than that of the rotating field whereby adequate torque is obtained without undue electric power requirements and without the cost, space, inertia, and lubrication problems associated with more conventional electric motor and reduction gear steering systems.

Yet another object of this invention is the provision of an improved electromagnetic steering apparatus of the foregoing character wherein one or more of the stator segments may be removed from the apparatus for repair, or replacement without interrupting the operation of the apparatus, an important factor in the case of a ship at sea.

As another object of the invention aims to provide an electromagnetic apparatus having a stator comprising a circular array of removable stator segments and means for accurately adjusting the circumference of the circular array to provide a desired difference between the inner circumference of the stator and the outer circumference of a rotor which is hypocyclically rotated within the stator, the stator construction being such that removal or replacement of a stator segment may be accomplished without disturbing the circumferential adjustment of the remaining stator segments.

Still another object of the invention is the provision of a novel and improved steering apparatus for electromagnetically positioning a rudder shaft and which, upon complete failure of electric power, presents no interference with rotation of the rudder shaft by emergency steering means such as a tiller or the like.

The invention may be further said to reside in certain constructions and arrangements of parts by which the foregoing objects and advantages are attained, as well as other which will become apparent from the following detailed description of a presently preferred steering gear embodying the invention when read in conjunction with the accompanying sheets of drawings forming a part of this specification, and in which.

Figure 1:
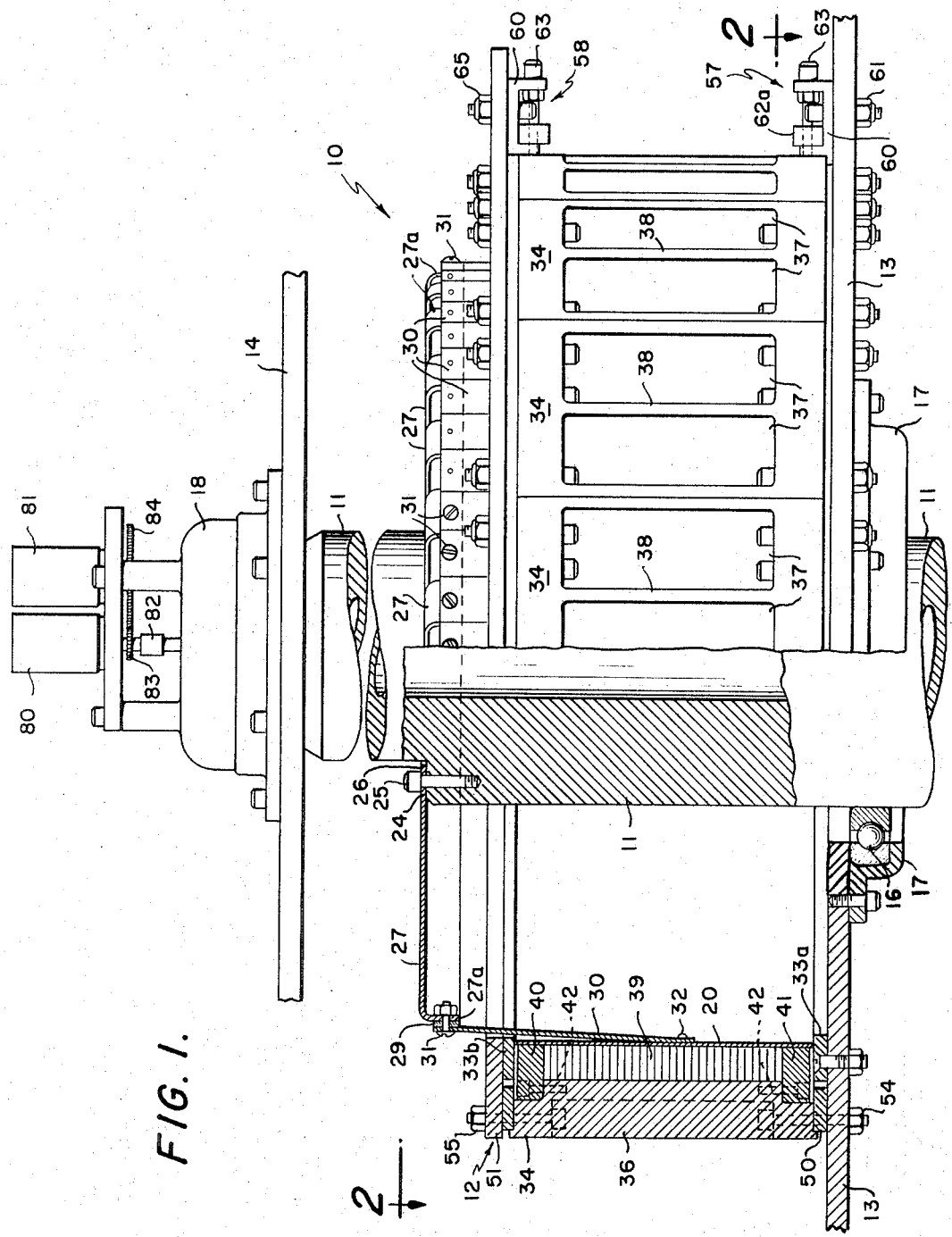
FIG. 1 is a front view, partly in elevation and partly in section, of an electromagnetic steering device apparatus embodying the invention.

In the form of the invention illustrated in the drawings and described hereinafter there is provided an electromagnetic steering apparatus generally indicated at 10, which is adapted to rotatively position a ship's rudder shaft 11 for purposes of steering the ship.

Figure 11:
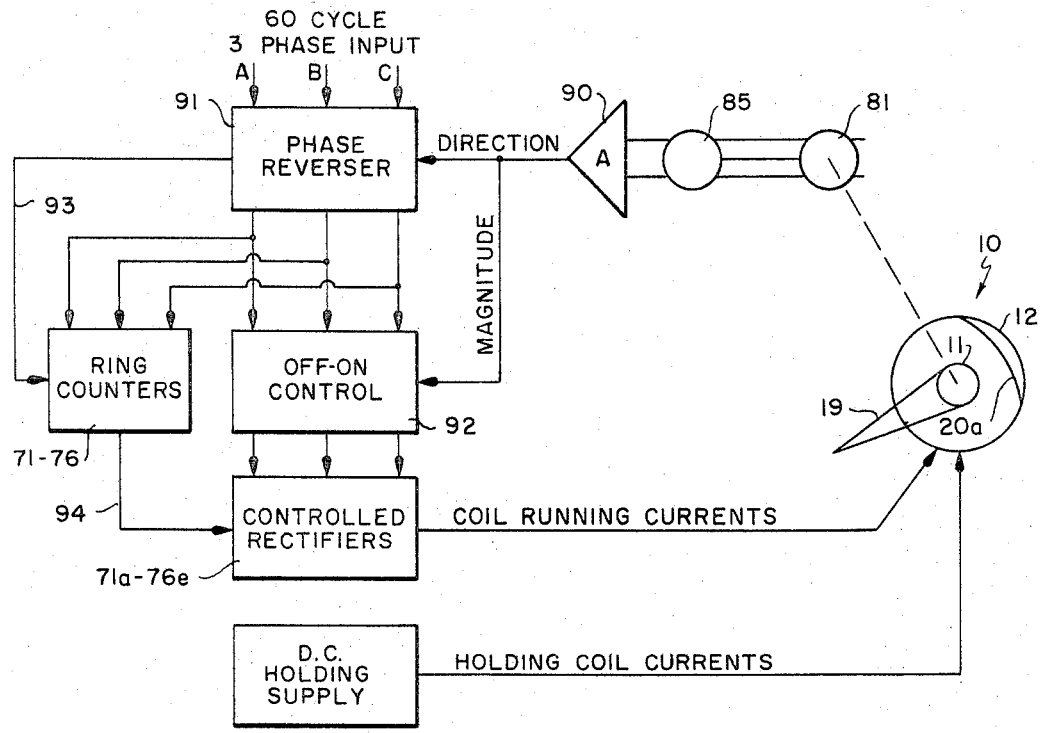
FIG. 11 is a schematic illustration of a ship steering control system including steering apparatus embodying this invention.

The apparatus 10 comprises an annular stator 12 which is in concentric surrounding relation to the rudder shaft 11 and is supported by a lower platform deck 13 below an upper platform deck 14. The rudder shaft, hereinafter referred to simply as shaft 11, extends upwardly through the platform decks 13 and 14 and is rotatably journaled in suitable bearings carried by the platform decks. One such bearing is indicated at 16 and is secured to the lower platform deck 13 by suitable retainer means 17. Another bearing, not shown, is secured to the platform deck 14 by suitable retainer means 18 at the upper end of the shaft 11. Mounted at the lower end of shaft 11, externally of the ship's hull, is a conventional rudder 19 (FIG. 11).

Connected to the shaft 11 by rotor support means about to be described, is a flexible annular rotor 20 which cooperates with the stator 12 in a manner described more fully hereinafter to effect rotation of the shaft 11 in either direction or to hold the shaft in selected rotative positions as necessary to the steering operation of the ship.

The rotor 20 comprises a thin-walled cylinder of a readily flexible and magnetically attractable material such as a low carbon steel and, in this example, is of a single thickness. That is to say, the rotor 20 is not of laminated construction in this instance although it may be laminated to reduce eddy-current losses.

The rotor 20 is supported in coaxial relation to the shaft 11 in the following manner. The shaft 11 presents, near its upper end, an upwardly facing shoulder 24. Secured to the shoulder 24, as by screws 25, is an annular hub 26 from which extend a plurality of radially directed spokes 27 forming part of the mentioned rotor suspension system. The hub 26 and spokes 27 are conveniently made from a single sheet of steel of suitable character to provide strong yet resilient spokes each of which acts in the nature of a cantilever spring. The spokes are spaced from one another at their outer ends by an amount substantially equal to the breadth of the spokes at their outer ends.

The outer ends of the spokes 27 are downturned as indicated at 27a, the downturned ends being embraced by a metal hoop 29. Depending from the metal hoop 29 are a plurality of flat, rotor suspension springs 30 which are secured at their upper ends to the hoop 29 by suitable fasteners 31. There are twice as many suspension springs 30 as there are spokes 27, and the fasteners 31 at the upper end of every other suspension spring serve also to secure the respective spokes 27 to the hoop 29 so as to form a unitary suspension system for the rotor 20.

The lower ends of the springs 30 are secured to the inner surface of the circumferential mid-portion of the rotor 20 as by suitable fasteners 32. The spokes 27 of the suspension system, acting as cantilever springs, permit the rotor to undergo slight movements axially of the shaft 11 as necessary to permit ready installation and alignment of the apparatus. The springs 30 permit the rotor to be displaced somewhat from its normal coaxial relation with the shaft 11 and also to be deformed somewhat from its normal cylindrical configuration in its cooperation with the stator structure 12.

In addition to the rotor support structure just described, the rotor is axially confined between lower and upper retainer rings 33a and 33b. These retainer rings 33a and 33b are engageable by the edges of the stator 20 and are conveniently made of a suitable friction reducing material such as nylon or the like.

Figure 2:
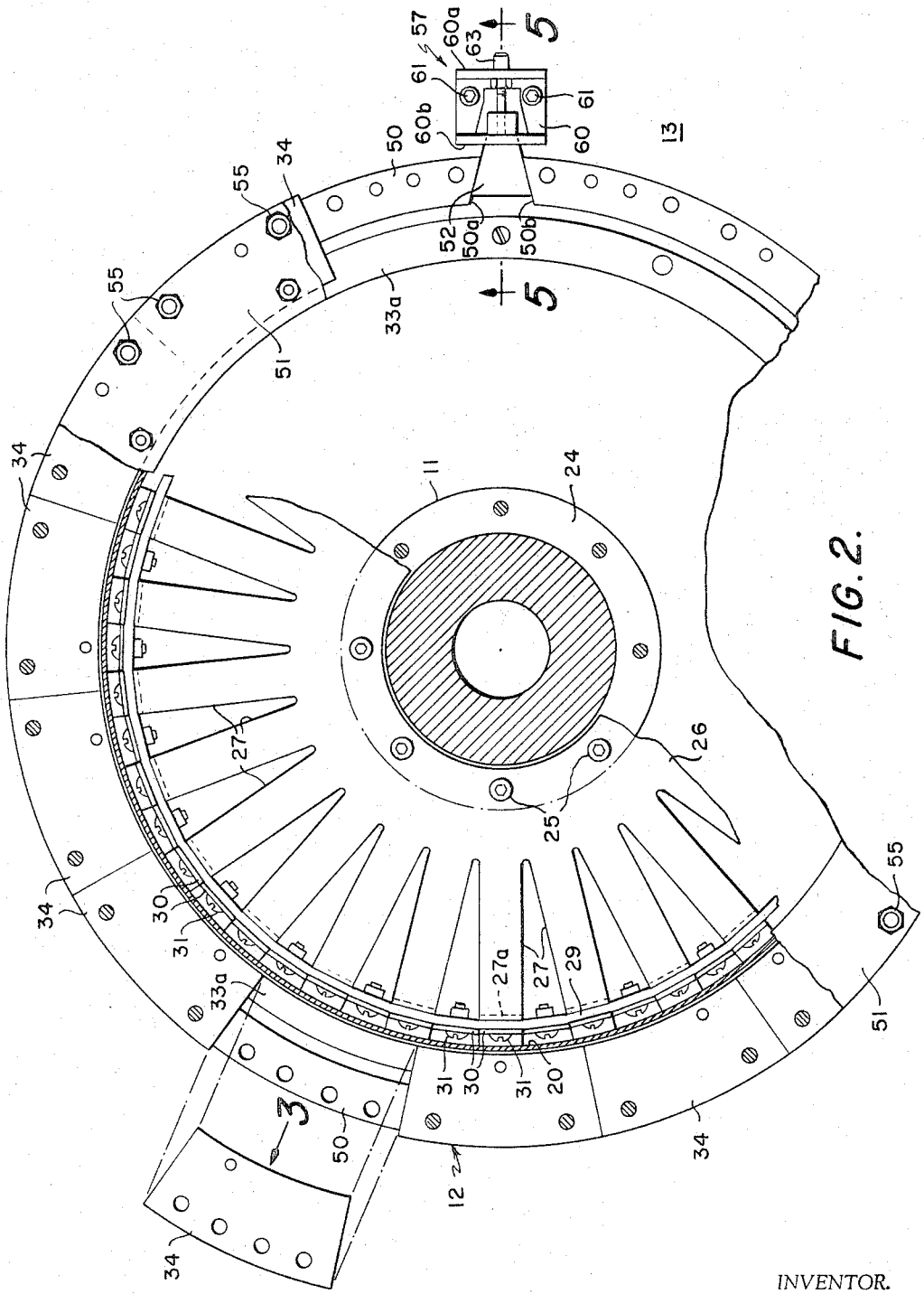
FIG. 2 is a plan view of the apparatus as viewed substantially along line 2—2 of FIG. 1, various parts being broken away to reveal hidden structures.
Figure 3:
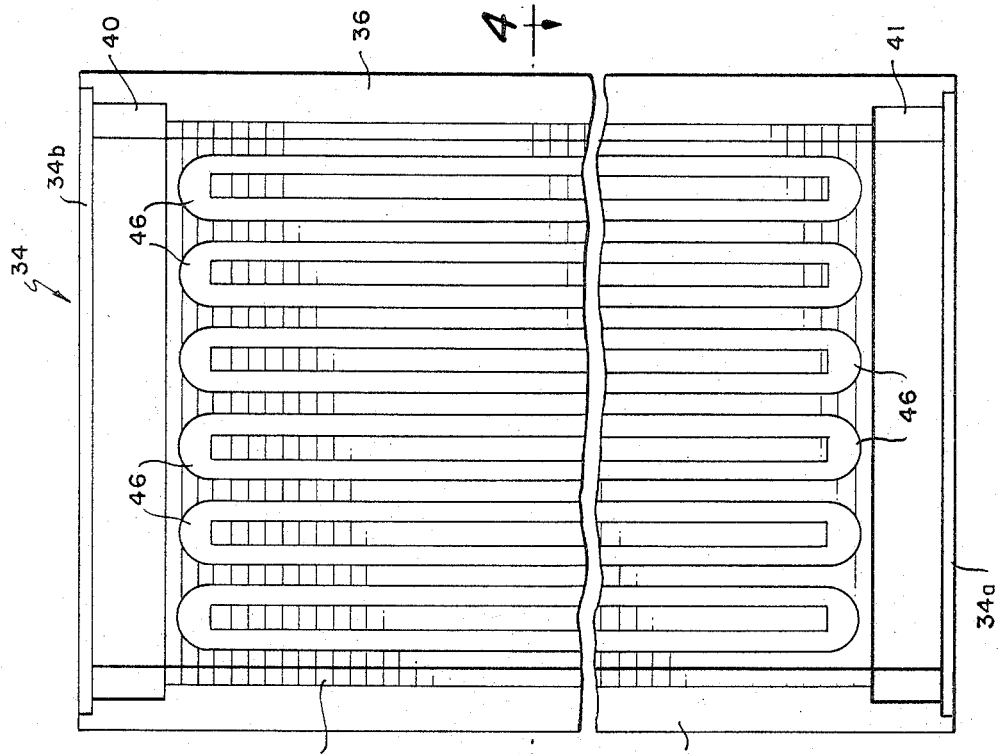
FIG. 3 is an enlarged elevational view of a stator segment viewed along the arrow 3 of FIG. 2.

Referring to FIG. 2, the stator 12 may be seen to be made up of plurality of wedge shaped stator segments 34 arranged in a circular array about the rotor 20 and concentrically with the shaft 11. In the present example, the segments 34 are fifteen in number, although it will be understood that more or fewer may be used in the practice of the invention.

Figure 4:
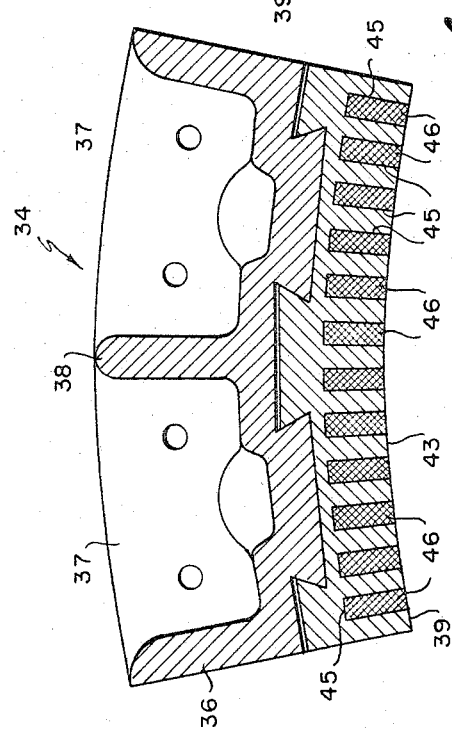
FIG. 4 is a sectional view taken along line 4—4 of FIG. 3.

As is illustrated in FIG. 4 each of the segments 34 comprises a wedge shaped body 36, preferably in the form of a casting having a pair of recesses 37 separated by a vertical rib 38. Dove-tailed to the radially inwardly directed side of the stator segment body 36 is a stack of stator laminations 39 confined between a pair of lamination retainer members 40 and 41 (FIG. 1) which are secured to the upper and lower ends of the body 36 by screws 42. The curved, inwardly directed surface 43 of the stack of laminations 39 is provided with a plurality of winding receiving recesses 45 which are distributed in this example to provide six recesses for each stator segment 34. The windings, indicated at 46, are comprised of running and holding coils which will be described more fully hereinafter.

The inside circumference of the stator 12 is somewhat larger than the outside circumference of the rotor 20 for a reason which will presently be made apparent, and means are provided for adjusting the stator circumference. To this end, the segments 34 are spaced at their lower ends from the platform deck 13 by a circumference adjusting split ring 50, and at their upper ends from an upper stator support ring 51 by a circumference adjusting split ring 52. Suitable bolts 54 and 55 are provided for securing the lower end and upper ends of the segments 34 to the platform deck 13 and to the support ring 51, respectively, with the bolts passing through the circumference adjusting rings 50 and 52. The bolts 54 and 55 are of substantially smaller diameter than the openings through which they pass in the rings 51, 50, 52 and in the platform deck 13 to permit adjustment of the circumference of the stator 12 through the agency of adjusting means 57 and 58 associated with the rings 50 and 52, respectively.

Figure 5:
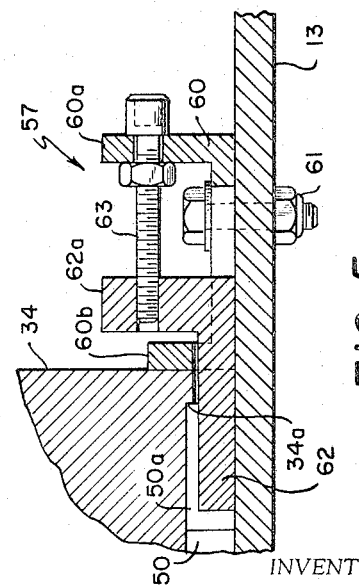
FIG. 5 is an enlarged fragmentary sectional view taken along line 5—5 of FIG. 2.

Referring to FIGS. 2 and 5 the adjusting means 57 comprises a U-shaped bracket 60 secured by bolts 61 to the platform deck 13 and provided with parallel uprights 60a and 60b. A portion of the upright 60b and of the bottom wall of the bracket 60 are cut away to accommodate a sliding wedge 62 having an upright portion 62a that is disposed between the uprights 60a and 60b. A draw bolt 63 extends freely through an opening in the upright 60a and is threadedly engaged in an opening in the upright 62a of the wedge 62. The wedge 62 is disposed in the split between the end surfaces 50a, 50b of the circumference adjusting ring 50 which engages a shoulder 34a of each segment 34.

Rotation of the drawbolt 62 by a suitable wrench, the bolts 54 and 55 first having been ascertained to be loose, causes the wedge 62 to be pulled outwardly so as to spread the ring end surfaces 50a, 50b and increase the circumference of the ring 50 and of the circular array of stator segments 24. The adjusting means 58 for the upper circumference adjusting ring 52 is identical in construction to the adjusting means 57 and the corresponding parts thereof have been given corresponding reference numerals. The bracket 60 of the adjusting means 58 is, of course, secured as by bolts 65 to the upper stator support ring 51 so that operation of the draw bolt 63 of the adjusting means 58 will cause the wedge 62 thereof to act on the end surfaces of the ring 52 which acts on a shoulder 34b of each segment 34 to effect expansion of the circumference of the stator.

Figure 8:
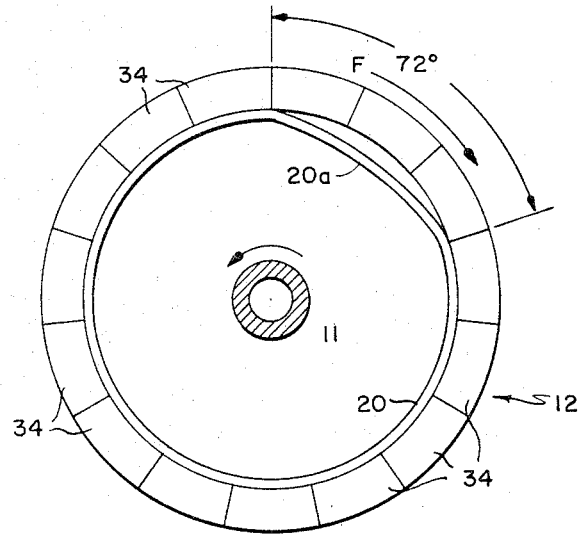
FIG. 8 is a diagrammatic illustration of the relationship between field and shaft rotation.

Once the desired radial clearance has been obtained between the rotor 20 and the stator 12 by means of the adjusting means 57, 58, and the rings 50, 52, the bolts 54, 55 are tightened, thereby uniting the stator segments 34 into a rigid stator structure 12. The amount of radial clearance desired between the rotor and the stator 12 is such that the stator can be magnetically displaced and deformed into contact with approximately 280° of the stator circumference as is illustrated in FIG. 8, further reference to which will be made in explanation of the operation of the apparatus.

As mentioned above, each of the fifteen stator segments 34 is provided with six winding recesses 45 making a total of ninety such recesses for the stator 12. The windings 46 include both running coils and holding coils which are wound or positioned together in the same recesses 45. The running coil windings occupying the ninety recesses 45 are connected for energization or excitation in sets of three adjacent recesses. That is to say, each running coil has been divided to occupy three adjacent recesses 45 to provide a smoother flux pattern. The running coils (FIG. 6) will therefore be considered hereafter as being thirty in number and are indicated in the drawings as R1, R2, . . . R30. Similarly, the holding coils occupying the ninety recesses 45 may be considered as thirty holding coils and will be referred to hereafter as holding coils H1, H2, . . . H30.

Figure 7:
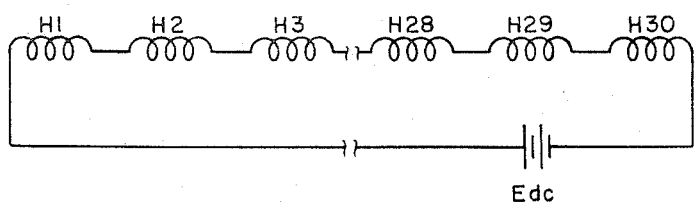
FIG. 7 is a schematic illustration of the interconnection of holding coils and a direct current source.

The holding coils H1, H2, etc., are connected (see FIG. 7) for continuous energization with direct current from a suitable source $Edc$ so as to provide, in the absence of energization of the running coils, a magnetic flux tending to magnetically draw the rotor 20 in all radial directions toward the inner surface of the stator 12. Because the rotor 20, as pointed above, is somewhat smaller in circumference than the inner surface of the stator 12, the rotor is deformed into magnetically clamped engagement with about 288° of the stator circle, while the remaining 72° of the rotor is an unclamped zone indicated at 20a in FIGS. 8 and 11.

In order to effect rotation of the rotor 20 and shaft 11 in a counter-clockwise direction for example, the running coils R1, R2, etc., are sequentially energized and deenergized so as to provide a clockwise rotating field F (FIG. 8) the magnetic flux of which bucks or cancels the flux of the holding coils H1, H2, etc., thereby causing the unclamped zone 20a of the rotor to rotate with the field. In effect, the rotor 20 rolls or "walks" around the inner circumferential surface of the stator in a hypocyclical manner, with the difference in circumferences providing a substantial reduction in rate of rotation of the rotor with respect to the field F.

Figure 6:
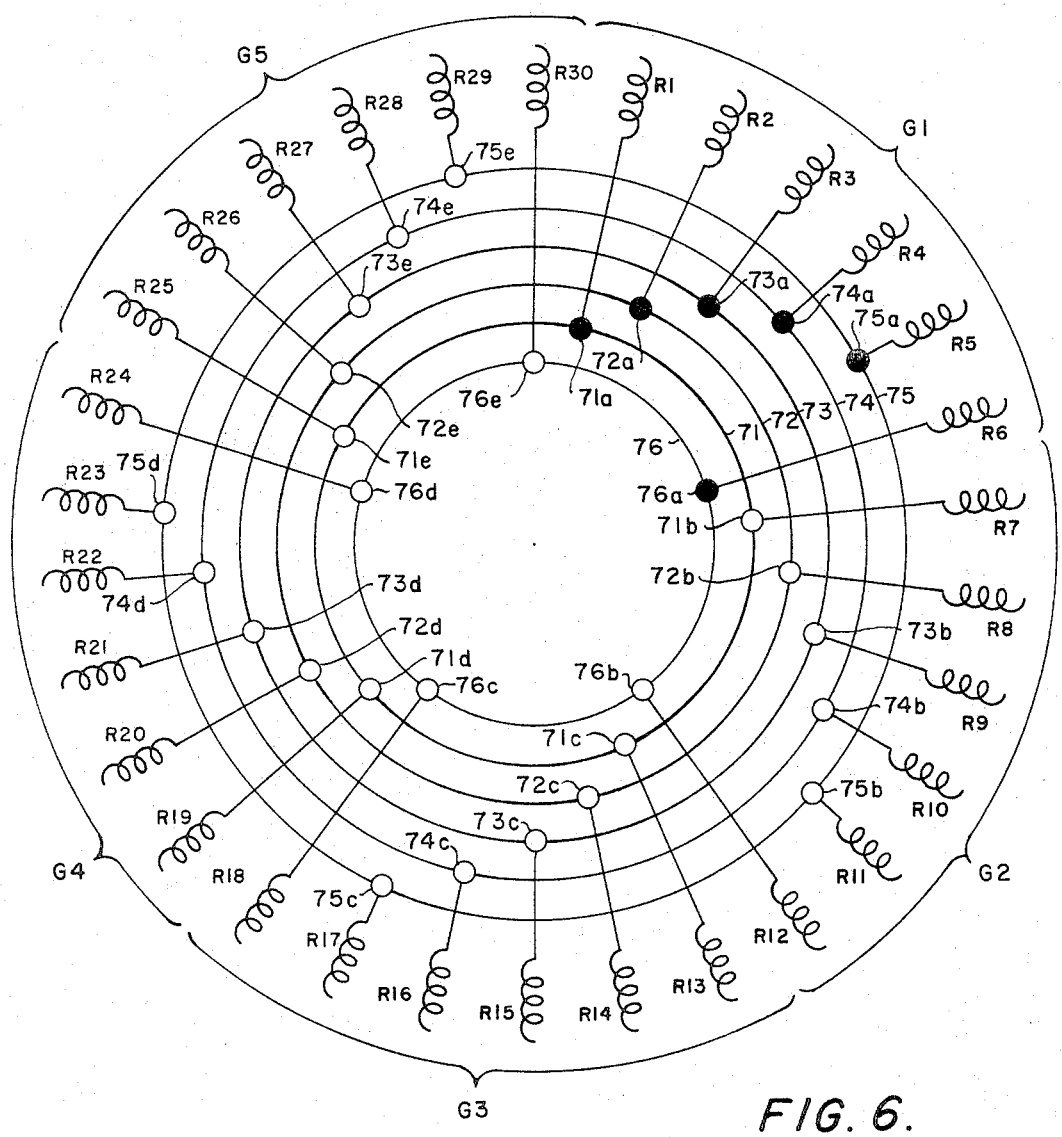
FIG. 6 is a schematic illustration of the relation between ring counters and running coils for effecting a rotating field.
Figure 9:
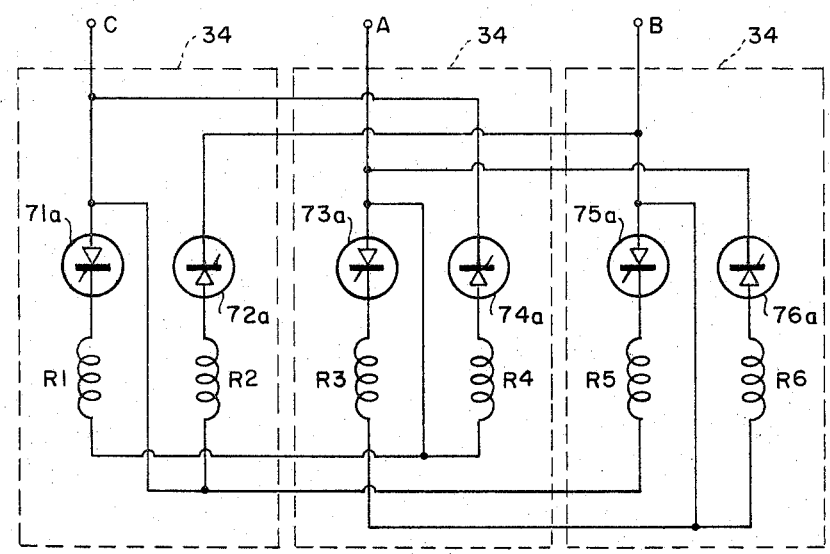
FIG. 9 is a schematic illustration of a running coil group and their connection to controlled rectifiers for energization from three phase alternating current.

Reverting to FIG. 6, the running coils R1, R2, etc., are divided into five coil groups each comprising six running coils, the inter-connections of the coils of one such group G1 being illustrated in FIG. 9. The running coils are energized from a three phase alternating current source under the control of six, five stage, reversible ring counters 71–76 schematically represented by concentric circles in FIG. 6. The ring counters may be of any suitable well known circuitry such as those utilizing transistors or silicon controlled rectifiers as the active power transmitting control elements of the successive stages. In FIG. 6 the controlled rectifier elements are indicated at 71a–71e, 72a–72e, . . . 76a–76E. The use of three phase alternating current, the phases being indicated as A, B, and C, provides six distinct recurring half cycle conditions each of which is utilized to control the stepping operation of one ring counter. At any one time there are six conducting controlled rectifier elements, one for each ring counter, the six conducting elements 71a, 72a . . . 76a for a given time being indicated by black dots in FIG. 6, the nonconducting controlled rectifier elements being indicated by open circles in that figure.

Figure 10:
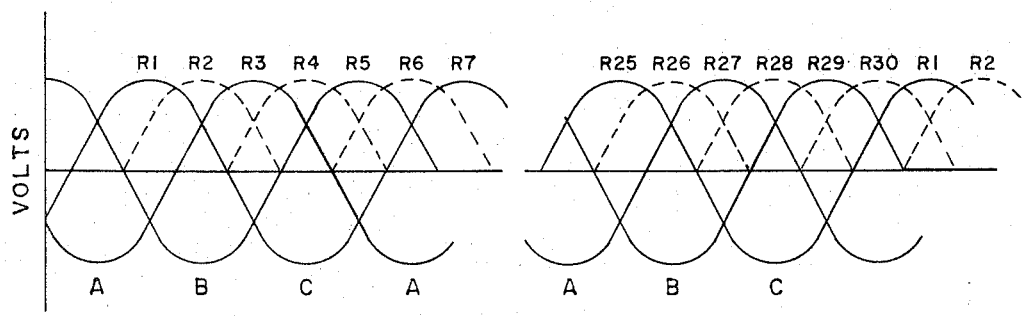
FIG. 10 is a graphic illustration of voltage progression with time and the relationship of running coil energization thereto.

The sequential energization or excitation of the running coils under the control of the ring counters is such that as controlled rectifier 71b becomes conductive to energize coil R7, controlled rectifier 71a becomes nonconductive to deenergize coil R1. In the case of sixty cycle per second three phase alternating current supply, the six coils of each of the groups G1–G5 are traversed in one sixtieth of a second, and it follows that every 360th part of a second, the next running coil is energized and the sixth preceeding running coil is deenergized. This relationship is apparent from FIG. 10 which illustrates the voltage progression with time and the resulting running coil energizations which produce the rotating field F described above.

Referring to FIG. 1, the steering apparatus 10 is provided with servo-amplifiers 80 and 81, the former being coupled directly by coupling means 82 to shaft 11 for transmitting rudder position to a suitable indicator. The servo-amplifier 81 is driven from shaft 11 by gears 83, 84 to provide a follow-up signal which is compared with a control signal generated by a helm operated servo-amplifier 85 (FIG. 11).

The helm operated servo-amplifier 85 provides an input signal which is related to direction and magnitude of error between the rudder 19 and the helm position. This input signal is applied to a suitable amplifier 90, the direction related component of the output therefrom being applied as input to a phase reversing circuit 91, and the magnitude related component of the output of amplifier 90 being applied as an input to an off-on running control 92.

The phase reversing circuit receives 60 cycle three phase electrical power as an input and serves to provide phase sequence reversal in its output to the off-on running control 92 if the direction input signal from amplifier 90 calls for running of the apparatus 10 in one direction to cancel the input signal from servo 85 to amplifier 90. If the direction input signal from amplifier 90 calls for operation of the apparatus 10 in the other direction, the phase reversing circuit 91 passes the three phase power intact to the off-on control 92.

The direction signal from amplifier 90 is further passed at 93 to the six, five positioning counters 71–76 which also receive as input the 60 cycle three phase reversing circuit 91. As explained heretofore, the ring counters 71–76 apply control signals via suitable conductor means 94 to the thirty silicon controlled rectifiers 71a–76e which ultimately control excitation of the running coil R1–R30, as necessary to effect the desired rotations of the rotor 20 and shaft 11.

One of the important features of the invention is the ability of the apparatus to continue to function effectively although one or several of the stator segments 34 be removed for inspection, repair or replacement. Thus, one of the segments 34 is illustrated in FIG. 2 as having been withdrawn from the array. The removal of a segment 34 requires only that the bolts 54, 55 be removed and coil lead wires (not shown) be disconnected to permit withdrawal of the segment from the array. The lead wires may be conveniently provided with suitable separable electrical connectors which automatically provide any necessary jumper connections when unplugged.

The removal and/or replacement of any segment 34 can be effected without disturbing the circumferential adjustment of the stator 12 which is maintained by the remaining segments and by rings 50, 52. Moreover, it is another advantageous feature that each of the segments 34 is electrically identical to the others, as are each of the ring counters, so that only a minimum number of replacement parts need be kept in store.

Removal of any one of the fifteen segments 34 will remove only two of the running coils R1, R2, . . . R30, which two coils represent the running windings in the six recesses 45 of the segment concerned and account for only 24° of the stator circle. Similarly removal of a single segment removes the holding coils corresponding to the removed running coils. The net result is a minor reduction in holding power and rotating power.

It will be noted that in the event of total electric power failure all of the holding and running coils are deenergized and the rotor 20 will assume a relaxed circular condition free of clamped engagement with any portion of the stator 12. Accordingly, in such circumstances the shaft 11 may be positioned by use of a mechanical tiller arrangement to effect emergency steering without any interference to rotation by the disabled apparatus 10.

Although the invention has been described in considerable detail with reference to a specific electromagnetic steering apparatus embodying the invention, it will be understood that the invention is not limited thereto, but rather the invention includes all those modifications, adaptations, substitutions, and uses as are reasonably embraced by the scope of the claims hereof.

What is claimed is:
1. Electromagnetic steering apparatus comprising:
   a circular stator presenting an inwardly directed cylindrical surface concentric with a steering shaft, said stator comprising a plurality electromagnetic coil means distributed along said surface;
   a rotor comprising an annular flexible band of magnetically attractable material, said rotor being disposed between said shaft and said surface and having an outer circumferential length which is shorter than the circumferential length of said cylindrical surface;
   rotor suspension means connecting said rotor to said shaft for rotation together, said suspension means permitting resilient radial deflection of said rotor with respect to said shaft and cylindrical surface; and
   means for energizing said coil means so as to provide a rotating field, whereby said rotor is magnetically clamped to a portion of said cylindrical surface and is caused to walk around the interior of said stator to effect rotation of said steering shaft.

2. Electromagnetic steering apparatus as defined in claim 1 and wherein said stator comprises:
   a circular array of stator segments; and
   means releasably securing said stator segments for individual removal from said array.

3. Electromagnetic steering apparatus as defined in claim 2 and wherein at least one of said coil means is associated with each of said segments for removal therewith.

4. Electromagnetic steering apparatus as defined in claim 2 and comprising adjusting means for varying the circumference of said circular array of stator segments.

5. Electromagnetic steering apparatus for rotatably positioning a steering shaft, said apparatus comprising:
   a stator including a plurality of stator segments disposed in a circular array coaxially with said shaft and presenting an inwardly directed cylindrical surface, said stator segments each comprising electromagnetic coil means;
   means releasably securing said stator segments for individual removal from said array;
   adjusting means cooperable with said array of stator segments for varying the circumference of said cylindrical surface;

a rotor comprising an annular flexible band of magnetically attractable material, said rotor being disposed within said stator and having an outer circumference which is less than the circumference of said cylindrical surface;

rotor suspension means connecting said rotor to said shaft for rotation together, said suspension means permitting resilient radial magnetic deflection of said rotor with respect to said shaft for engagement of said rotor with said cylindrical surface;

electrical control means for controlling energization of said coil means to effect said magnetic deflection of said rotor and to effect a zone of magnetically clamped engagement of said rotor with a major portion of the circumference of said cylindrical surface, said control means being operative in response to steering input signals to control said energization of said coils to provide a magnetic field rotating in one direction whereby said rotor is caused to travel hypocylically along said cylindrical surface and effect rotation of said shaft in a direction opposite to rotation of said field.

6. Electromagnetic apparatus as defined in claim 5 and wherein said adjusting means comprises:

a split ring member having spaced end surfaces, said ring member engaging said segments;

means acting on said end surfaces and operable to expand said ring to vary the circumference of said circular array of stator segments.

7. Electromagnetic apparatus as defined in claim 5 and wherein said stator support means comprises:

a plurality of cantilever spring elements projecting radially from said shaft;

a hoop interconnecting the ends of said cantilever springs; and a plurality of axially extending leaf springs each having one end fixed to said hoop and the other end connected to said rotor.

References Cited
UNITED STATES PATENTS

| | | | |
|---|---|---|---|
| Re. 22,549 | 9/1944 | Plensler | 310—82 |
| 2,250,947 | 7/1941 | Carpenter | 103—118 |
| 2,561,890 | 7/1951 | Stoodard | 310—66 |
| 2,579,865 | 12/1951 | Roters | 172—120 |
| 2,761,079 | 8/1956 | Hedstrom | 310—66 |

MILTON O. HIRSHFIELD, *Primary Examiner.*

J. D. MILLER, *Assistant Examiner.*